(No Model.)
W. G. STRYPE.
PROCESS OF MAKING HYDRATES OF BARIUM AND OF STRONTIUM.
No. 326,066. Patented Sept. 8, 1885.
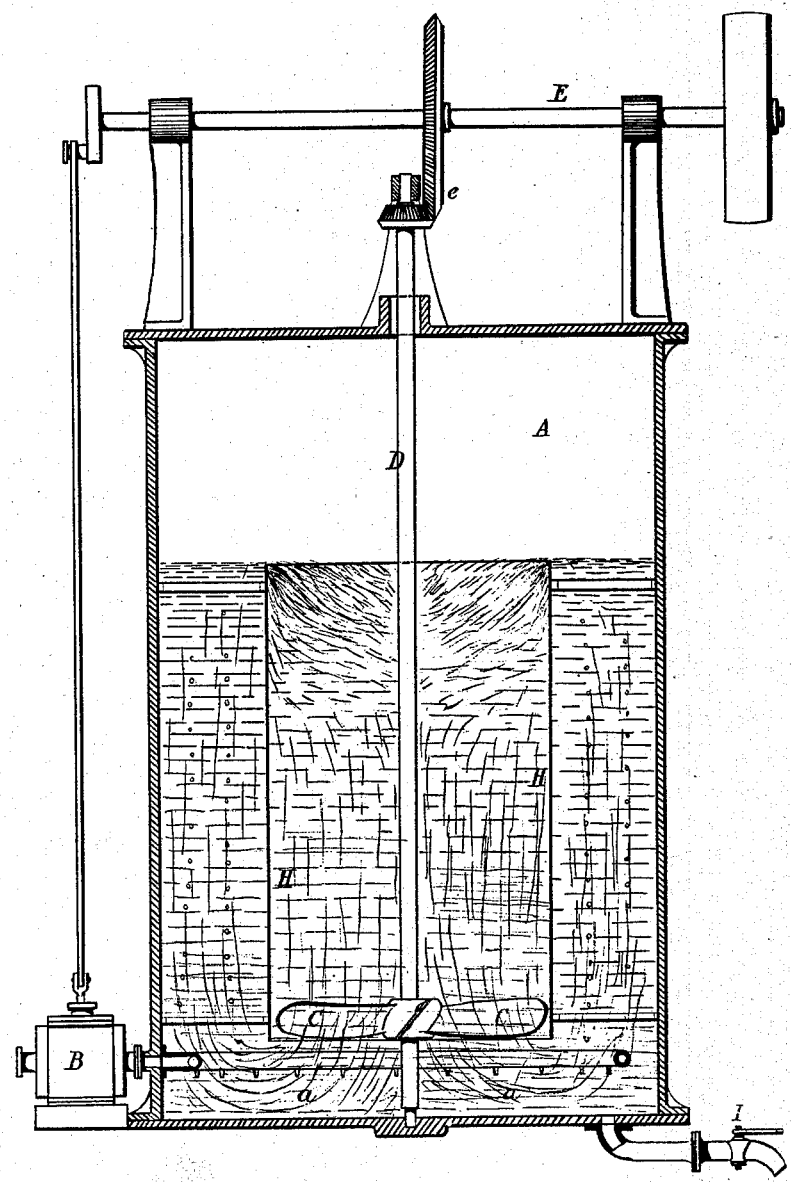
Witnesses
Henry Bossert
Harry Drury
Inventor:
W. G. Strype
by his Attorneys
Howson & Son

UNITED STATES PATENT OFFICE.

WILLIAM GEORGE STRYPE, OF WICKLOW, IRELAND.

PROCESS OF MAKING HYDRATES OF BARIUM AND OF STRONTIUM.

SPECIFICATION forming part of Letters Patent No. 326,066, dated September 8, 1885.

Application filed January 8, 1885. (No specimens.) Patented in England December 20, 1884, No. 16,769.

*To all whom it may concern:*

Be it known that I, WILLIAM GEORGE STRYPE, manufacturing chemist, a subject of the Queen of Great Britain and Ireland, and residing at Wicklow, Ireland, have invented certain Improvements in the Production of Hydrates of Baryta and Strontia, (for which I have applied for a patent in Great Britain, No. 16,769, on the 20th day of December, 1884,) of which the following is a specification.

This invention relates to the production of the hydrates of baryta and of strontia; and it consists in effecting the decomposition of a solution or of solutions of the sulphide or sulphides of barium or of strontium by means of oxides of iron—such, for example, as bog iron ore, ocher, or other hydrated oxides of iron—in conjunction with a current of atmospheric air.

In carrying out my invention, I add to an aqueous solution of either of the before-mentioned sulphides either of the oxides before mentioned, or a mixture of the same; and I cause the oxides to be brought in contact with the solution of sulphides, and then I submit the mixture to the action of a current of air, (such air, by preference, being previously deprived of the carbonic acid admixed therewith,) which is caused to pass through the mixture while it is maintained in a state of agitation, such agitation being by preference assisted and effected in the manner herein described or otherwise. I continue to pass the current of air through the mixture until the solution has become desulphurized, and I then cause or allow the insoluble oxide of iron, together with the sulphur eliminated therefrom, to separate from the solution, which separation may be conveniently effected by subsidence, filtration, or otherwise. The residue, consisting, essentially, of oxide of iron and sulphur, is then to be subjected to lixiviation, or may be otherwise treated, in order that the sulphur may be separated and obtained therefrom. I then draw off the supernatant solution, which may be submitted to concentration; or it may be otherwise treated or employed, as may be desired.

The sulphides of barium or of strontium may be conveniently obtained by heating a mixture of the sulphate baryta or of strontia with carbonaceous or reducing materials in a retort or suitable furnace, as is well understood.

The accompanying drawing represents in sectional elevation an apparatus which may be advantageously employed in carrying out my invention.

It is to be understood that I do not limit myself to the use of this precise form of apparatus here shown, which is merely given as an example of what I believe to be the most convenient way of carrying my invention into practice.

The said apparatus consists of a vessel, A, in which the mixture of the solution of the sulphide or sulphides with the oxide of iron is contained.

B represents an air-pump, by means of which air is forced through the perforated pipe or coil $d$ into the mixture contained in the vessel A, whereby the said mixture is agitated, which agitation may be further increased by means of an agitator, C, carried on the shaft D, which can be conveniently rotated by means of gearing $e$ from a counter-shaft, E, driven by any suitable means in the ordinary way of actuating agitator-shafts. The air-pump B may also be driven from the shaft E, as shown.

The agitator C is arranged to work in a cylinder, H, fitted in the interior of the vessel A, so that a constant circulation of the mixture is obtained. By this means the sulphide solutions may be thoroughly desulphurized, and when this has been effected the contents of the vessel A are drawn off by the cock or valve I into a settling-tank, K, in which the solid particles settle, after which the desulphurized solution is decanted or drawn off by means of what is known as a "loose leg," L, or by other convenient means.

I am aware that oxide of iron has been used to reduce alkaline sulphides, and therefore do not claim this, broadly; but

I claim as my invention—

The mode herein described of producing hydrates of baryta or strontia, said mode consisting in subjecting a solution of a sulphide of barium or strontium to the action of currents of air in the presence of an oxide of iron, substantially as set forth.

In testimony whereof I have signed my name to this specification in the presence of two subscribing witnesses.

W. G. STRYPE.

Witnesses:
CHAS. MILLS,
CHAS. JAS. JONES,
*Both of 47 Lincoln's Inn Fields, London.*